United States Patent [19]

Hansson

[11] 4,289,439
[45] Sep. 15, 1981

[54] VEHICLE CARRIED MANURE REMOVING MACHINE

[75] Inventor: Bengt O. Hansson, Norrtälje, Sweden

[73] Assignee: Aktiebolaget Sundsvalls Specialprodukter, Sundsvall, Sweden

[21] Appl. No.: 954,538

[22] Filed: Oct. 25, 1978

[30] Foreign Application Priority Data

Oct. 25, 1977 [SE] Sweden ............................. 7712018

[51] Int. Cl.³ .............................................. B60P 1/40
[52] U.S. Cl. ............................... 414/523; 15/93 R; 198/518; 414/505; 414/526
[58] Field of Search ............... 414/523, 526, 504, 465, 414/505, 466; 198/518, 670, 661, 657; 15/340, 383, 385, 93 R, 373

[56] References Cited

U.S. PATENT DOCUMENTS

| | | | |
|---|---|---|---|
| 804,525 | 11/1905 | Ericsson | 198/518 |
| 2,057,403 | 10/1936 | Vali et al. | 414/526 X |
| 2,770,837 | 11/1956 | Reifenhäuser | 198/670 X |
| 2,800,238 | 7/1957 | Oliver | 414/505 X |
| 2,855,085 | 10/1958 | Olson | 198/518 |

FOREIGN PATENT DOCUMENTS 1122444 1/1962 Fed. Rep. of Germany ...... 414/526

Primary Examiner—Stephen G. Kunin
Assistant Examiner—Edmond G. Rishell, Jr.
Attorney, Agent, or Firm—James C. Wray

[57] ABSTRACT

A manure removing machine carried by a vehicle having a mechanically driven feeder screw for taking up manure and other waste material where the machine includes an elongated horizontal casing around the feeder screw and a receiving mouth axially disposed in the casing. The casing at one end is connected to a tube directed vertically upward and guided into a tube socket that is fixed to the vehicle. The socket is in communication with a collection box carried by the vehicle. The feeder screw and casing are rotatable outward from under the vehicle to a position perpendicular to the longitudinal axis of the vehicle.

7 Claims, 7 Drawing Figures

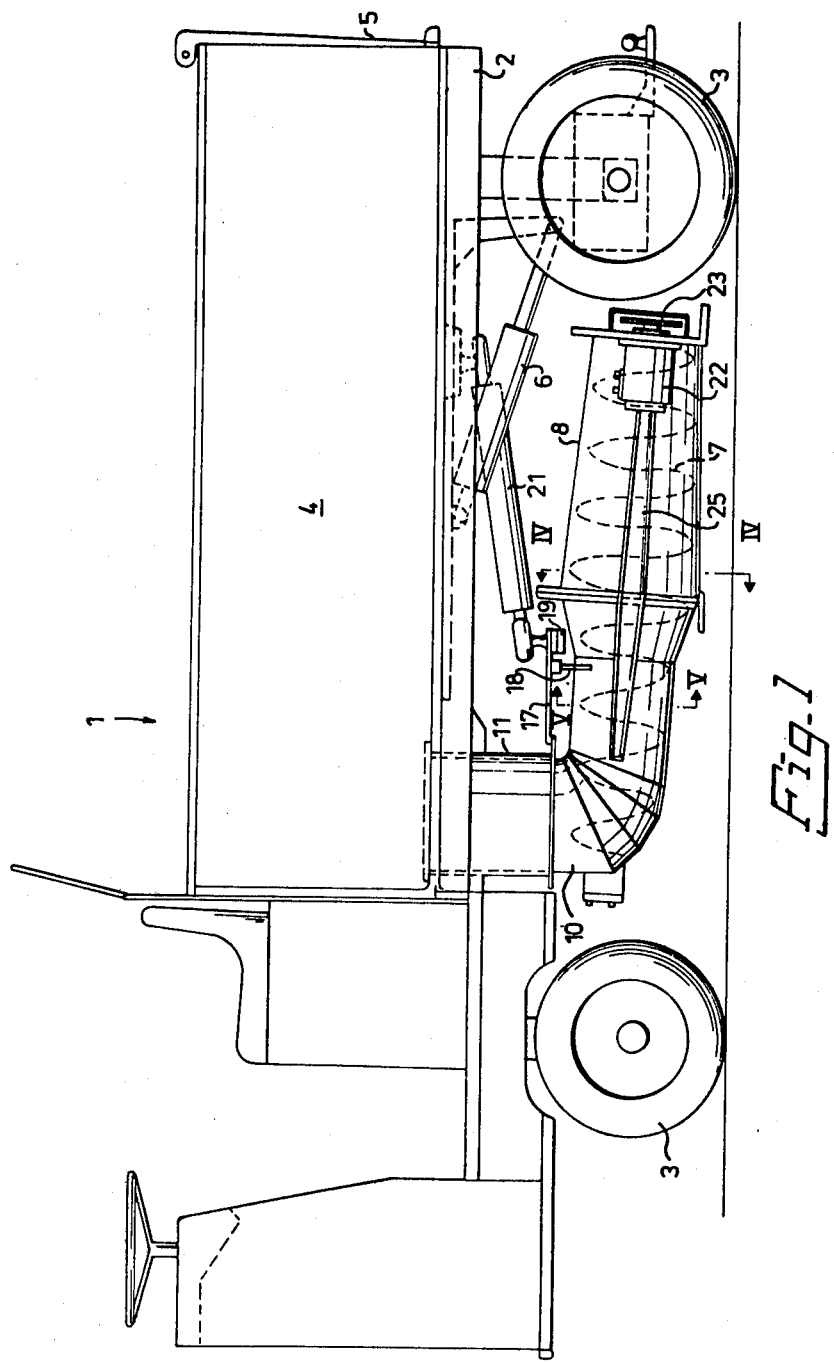

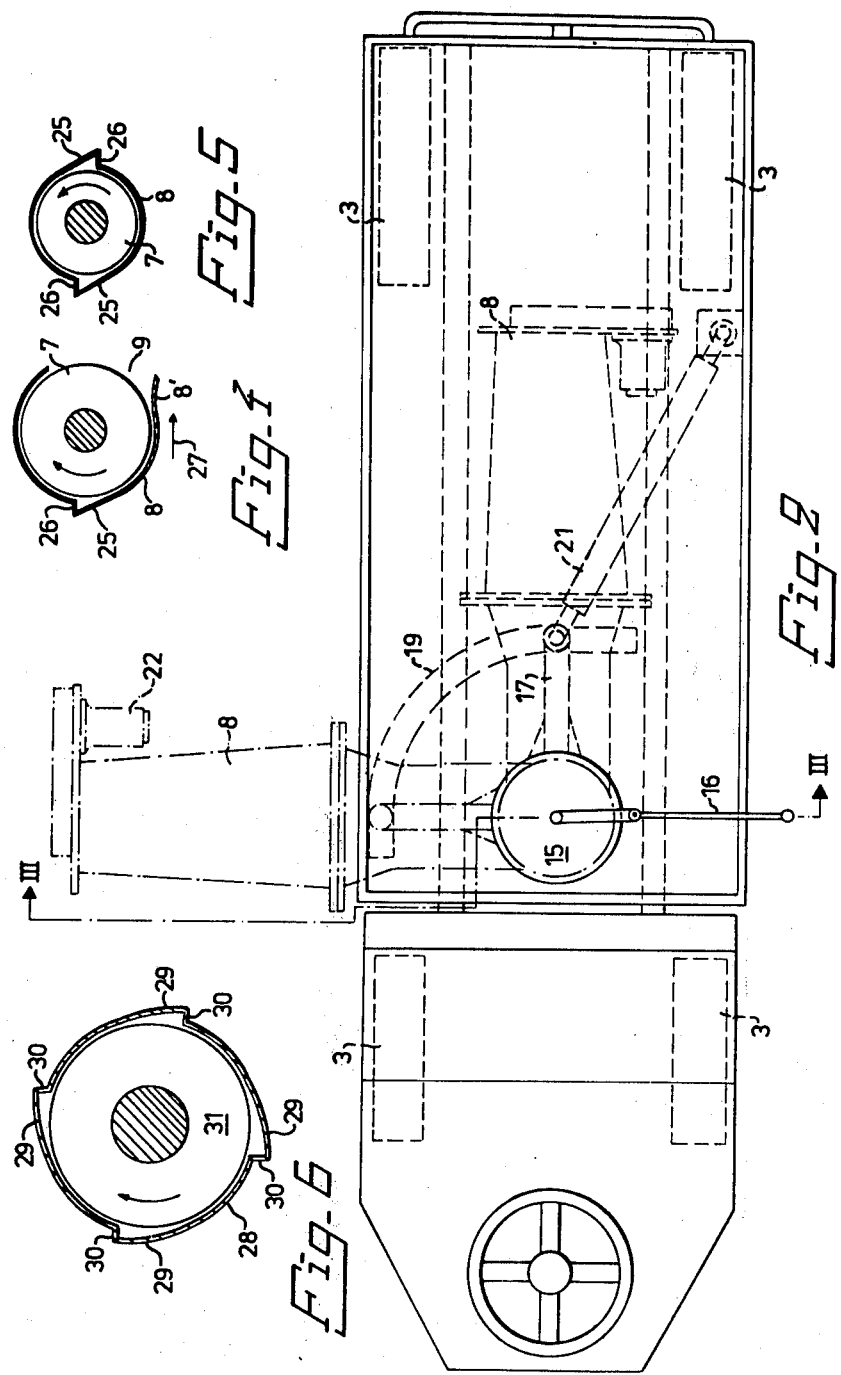

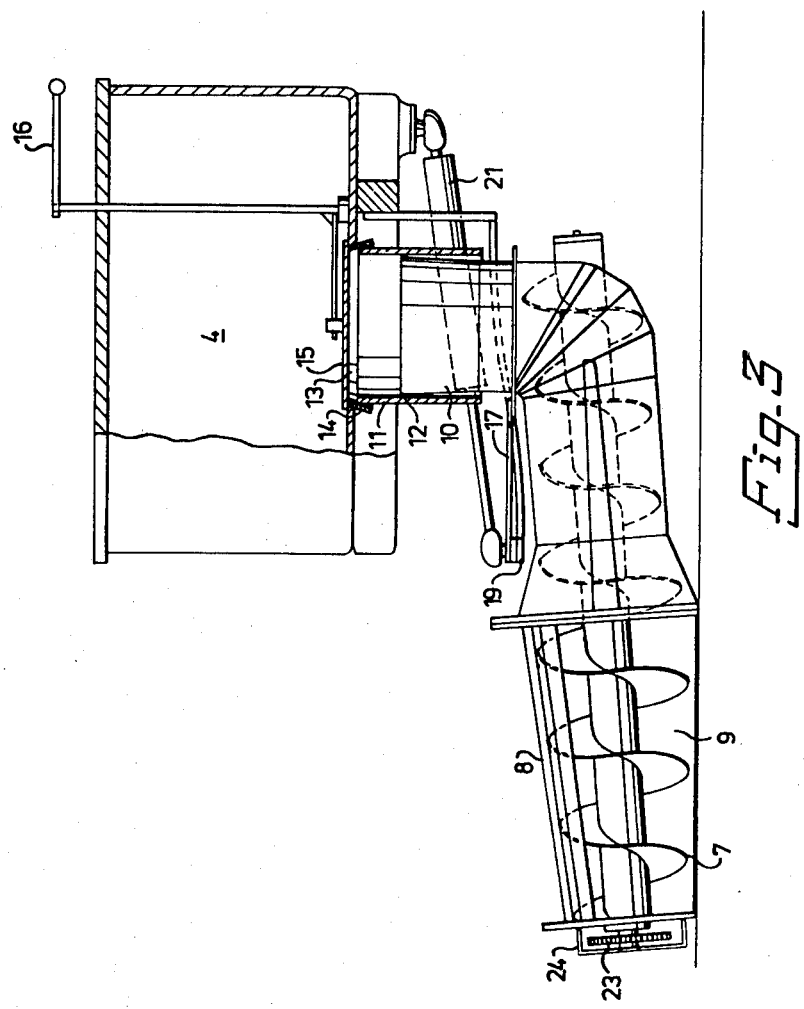

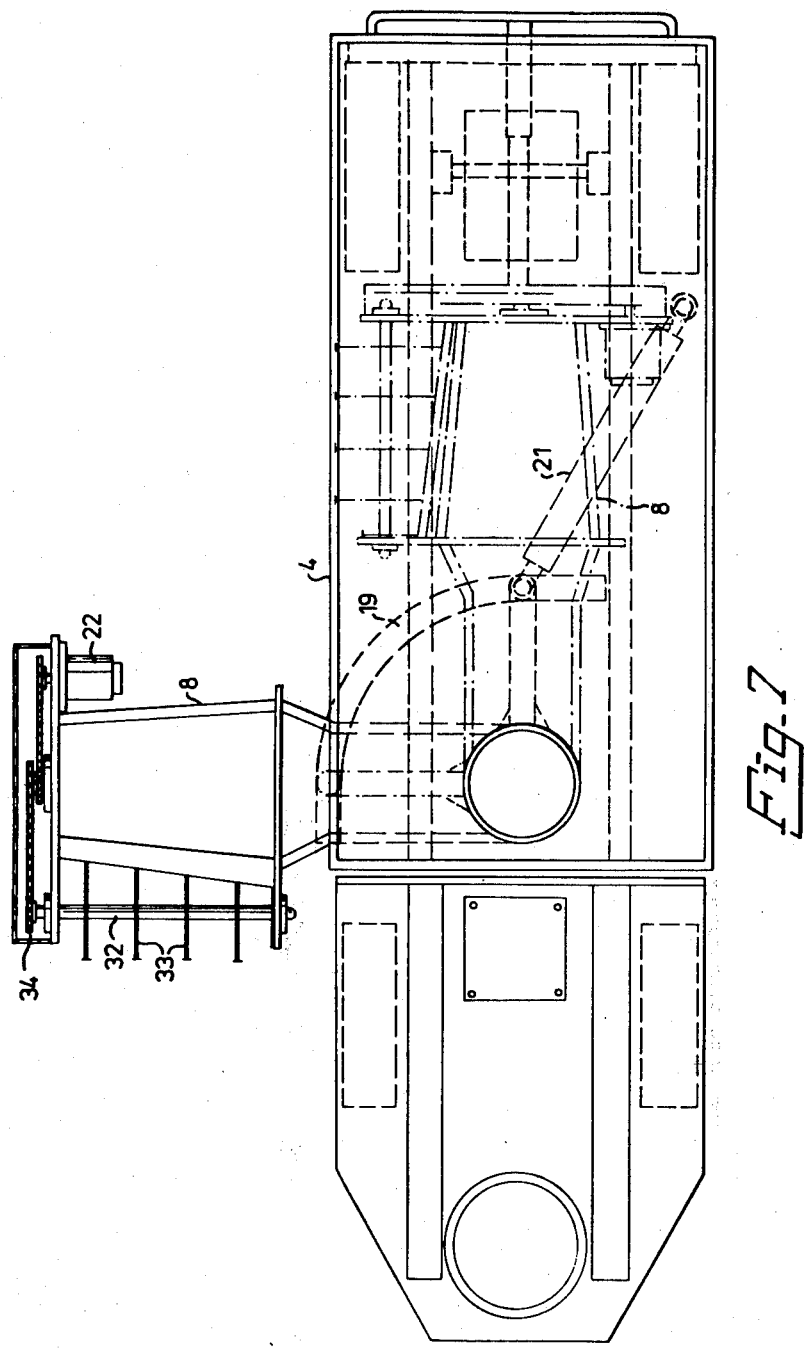

VEHICLE CARRIED MANURE REMOVING MACHINE

SUMMARY OF THE INVENTION

The present invention relates to a vehicle carried manure removing machine having a feeder screw for collecting manure or other waste material and especially intended for removing manure from animal farms like mink farms having animal cages carried on legs and for collecting manure and other stuff from the animals underneath the cages.

Depending on the presence of the legs of the cages removing of manure has until now been made by raking out the collection of manure, whereupon the manure and other material was collected and removed by machines.

The object of the present invention is to provide a manure removing machine formed so that it can easily collect manure and other material directly from underneath the cages in spite of the existence of the legs of the cages.

The said object is according to invention solved by means of a manure removing machine which is characterized as defined in the appended claims.

The invention is illustrated in the accompanying drawings as exemplifying and somewhat diagrammatically illustrating embodiments:

BRIEF DESCRIPTION OF THE DRAWINGS

FIG. 1 is a side view of a vehicle carried manure removing machine according to the invention;

FIG. 2 illustrates the manure removing machine from above;

FIG. 3 illustrates in somewhat enlarged scale a vertical cross section along line III—III of FIG. 2;

FIGS. 4 and 5 are cross sections along lines IV—IV and V—V of FIG. 1;

FIG. 6 is a cross section like that of FIG. 5 but of a modified embodiment of the invention;

FIG. 7 illustrates a second embodiment of the manure removing machine from above;

DETAILED DESCRIPTION OF THE DRAWINGS

The manure removing machine illustrated in FIGS. 1–5 comprises a carriage 1 having a chassis 2 supported by four driving wheels and a collection box 4 which is carried by the chassis and having an outwards foldable rear shutter 5 and a hydraulic tilting device 6 for emptying the content from the collection box 4.

A feeder screw 7 is surrounded by an elongated substantially horisontally extending casing 8 one end of which has an elongated receiving mouth 9 (FIGS. 3 and 4) provided on one side of the caging, and the opposite end is extended upwards by a substantially vertical tube 10 which formed the outlet opening for the casing 8. The said tube 10 is with the upper end thereof guided in a vertical tube socket 11 which is fixed mounted in the chassis 2. The socket 11 has a constant diameter along the entire length thereof whereas the vertical tube 10 from the upper end thereof which is preferably mounted by means of a conventional bearing 12 in the tube socket 11 tapers slightly downwards towards the casing 8 so that there is a space between the socket 11 and the tube 10 which is increasing in the direction downwards as best evident from FIG. 3. The bearing 12 also acts at a sealing and it can be made of rubber or other suitable sliding and sealing material. The upper mouth of the tube socket 11 is located just underneath the bottom of the collection box 4, and the said collection box is above the said mouth formed with an opening 13 having an angular screen 14 outside the mouth edge of the socket 11. A lid 15 is rotatable mounted and is actuatable by a hand lever means to cover or release the opening 13.

From a position corresponding to the interface between the tube 10 and the casing 8 a lever arm 17 extends radially outwards. The outer end of said arm 17 is by means of bar 18 connected to the casing 8 and is slidably supported by a guide bar 19 fixed mounted on the chassis 2. Said guide bar 19 is bow formed as seen from above in FIG. 2, and the highest point thereof is located under the central portion of the vehicle and it lowers continuously to a lowest point at one side of the vehicle (FIG. 3). Between the lever arm 17 and the chassis 2 there is an hydraulic apparatus 21 which can rotate the arm 17 and the casing 8 connected thereto including the feeder screw 7 between the position underneath the central portion of the vehicle indicated with the dotted lines of FIG. 2 and the laterally directed position in relation to the vehicle indicated by the point and dot lines of FIG. 2. The feeder screw 7 and the casing 8 consequently has one end position substantially in the longitudinal direction of the vehicle with the mouth 9 located a short distance above the ground or more particularly defined by the plain between the lowest points of the wheels 3 and a second end position with the feeder screw 7 and the casing 8 extending laterally on one side of the vehicle and with the lower side of the casing 8 substantially on the level with the ground.

On one side of the casing 8 and at the outer end thereof there is a hydraulic motor 22 which is adapted to drive the feeder screw 7 over a chain transmission 23 provided inside a casing 24.

The casing 8 is provided close to the periphery of the feeder screw 7, and as evident from FIGS. 4 and 5 it is formed with two longitudinally extending bulges 25 provided diametrically opposed and formed so that they each have a stopping surface 26 extending substantially along the entire length of the feeder screw and substantially radially of the feeder screw. Along the part of the casing having the receiving mouth 9 there is no bulge and no stopping surface as evident from FIG. 4. The portion 8' of the casing located along the lower edge of the receiving mouth 9 is adapted to slide along the ground and to be moved in the direction of the arrow 27 of FIG. 4.

FIG. 6 illustrates in a enlarged case a modified embodiment of the casing 28, which differs from the above described casing in that it is formed with four bulges 29 each having a stopping surface 30 extending axially with and radially of the feeder screw 31. The periphery of the feeder screw is located very close to the portions of the casing between the bulges 29 so that there is a very narrow space therebetween.

The described manure removing machine is utilized and acts and is advantageous as will be explained in the following. The manure removing machine is in the first hand intended for removing manure underneath animal cages like cages in mink farms, in which the cages are supported on legs and the bottoms of the cases have cases or holds like in nets, for letting manure from the animals and other waste material through, and which is consequently collected on the ground underneath the cages which are often provided in relatively long rows. As illustrated with the full lines of FIG. 1 the manure removing machine makes it possible for the vehicle to be driven with the feeder screw 7 and the casing 8 in a raised position under the vehicle adjacent the row of cages and can be stopped thereupon the hydraulic apparatus 21 is actuated to bring the bar 18 and thereby the feeder screw 7 and the casing 8 to rotate sideways at the same time as being lowered since the guide bar 19 is sloping, so that the feeder screw and the casing takes the position indicated with the point and dot lines of FIG. 2 and the full lines of FIG. 3, i.e. lowered to the ground level. During the said rotation and moving downwards the bearing 12 of the vertical tube 10 slides in the socket 11 and as the same time the tube 10 is positioned slightly obliquely in relation to the tube socket 11 what is possible since there is a space between the tube 11 and the socket 11 underneath the bearing 12. It is presupposed that the vehicle is stopped adjacent a cage so that the casing with the feeder screw can unprevented by the cage be rotated to a position under the cage in spite of the presence of the legs thereof. The hydraulic motor 22 is preferably started at the same time as the hydraulic apparatus 21 is started, and when the vehicle, possibly after driving backwards to a position adjacent a pair of legs is slowly driven forward the feeder screw collects through the receiving mouth 9 the heap of manure and other material and feeds said stuff through the tube 10 and the tube socket 11 and the opening 13 of the collection box, the lid 15 of which has in advance been rotated away from the opening 13 by the hand lever means 16, and the material is deposited in the collection box 4.

When the feeder screw thereafter arrives to the next pair of legs it is rotated rearwardly and into position under the vehicle and it is rotated laterally outwards when it has passed the legs. By the bulges 25 of the casing 8 and the stopping surfaces 26 is obtained that the manure, in spite of the resistance appearing when feeding the manure into the collection box 4, is still prevented from staying in the thread grooves of the feeder screw only sliding along the casing wall when the feeder screw is rotating, but by the friction resistance at the stopping surfaces the manure is forced forwards by the feeder screw. The described position of the stopping surfaces of the casing therefore is of substantial importance for the feeding of the manure. It is also of importance that the periphery of the feeder screw is located very closely to the casing portions between the bulges and that preferably several bulges and stopping surfaces are provided as illustrated in FIG. 6. By the manure removing machine it is possible to take up manure and other material under cages standing on legs, and this work can be done quickly and effectively.

According to FIG. 7 the embodiment of the manure removing machine illustrated in FIGS. 1-5 is modified substantially only in that a scratching means is provided in front of the casing 8 surrounding the feeder screw. The said scratcher comprises a shaft 32 extending parallelly with the machine axis and along the entire length of the receiving mouth and several radial scratcher pins 33 distributed along the shaft 32. The said shaft 32 is driven by a chain transmission from the shaft of the feeder screw as evident from FIG. 7. By the embodiment of the machine having the scratcher 32, 33 the particular advantage is obtained that the manure and hay and other means mixed up with the manure is broken up in front of the receiving mouth so as to more easily slide onto the casing portion 8' and is brought forward by the feeder screw.

The invention is not considered restricted to the embodiments described above and illustrated in the drawings and said embodiments can be modified within the scope of invention especially as concerns detail designs. Especially the driving and guiding means for rotating and lowering and raising the feeder screw can be modified in several ways. The end positions for the said rotation can differ from the ones illustrated in the drawings and the rotation can be made manually. The tube socket 11, which acts as a guide for slide bearing 12, widens in diameter downward. The vehicle for carrying the manure removing machine can have but need not have a driving motor for the driving, and the wheels can be substituted by runners. The manure removing machine can be useful for taking up several different types of waste material like decay sludge and other similar materials or any other stuffs or products which are to be collected from a surface, for instance from the ground.

What I claim is:

1. A manure removing machine carried by a vehicle and having a mechanically drived feeder screw for taking up manure and other waste material and similar, characterized in that the machine includes an elongated substantially horizontal casing (8) around the feeder screw (7) and said casing (8) has receiving mouth (9) axially disposed in the substantially horizontal section of said casing (8) an outlet end of the casing (8) is connected to a tube (10) directed substantially vertically upwards and guided in a tube socket (11) fixably mounted on said vehicle, and the upper end of the said tube socket (11) being brought to communicate with a collection box (4) carried by said vehicle, and that said feeder screw (7) and the casing (8) are together positively rotatable outward from under said vehicle about said tube (10) in a substantially horizontal plane and said feeder screw (7) and casing (8) are raised and lowered between an end position being substantially in the longitudinal axis of the vehicle chassis (2) and a short distance above a level plane through the lowest point of the vehicle wheels (3) and a second end position in which an outer longitudinal portion of the feeder screw (7) and the casing (8) is located outside of the vertical plane through the wheels of the vehicle on the same side as the screw and casing and with the lower side of the casing (8) substantially on the same level as the plane through the lowest point of the wheels (3) further characterized in that a horizontal level arm (17) extends radially out from the tube (10) wherein said lever arm is connected to the casing (8) by a bar (18), and the outer end of the lever arm (17) is supported by a guide bar (19), which is fixably mounted in the chassis of the vehicle and is bow formed and which guide bar (19) slopes from a high point fastened with means connected to said vehicle chassis and disposed under the central portion of the vehicle, lowers somewhat at a second end to a low point aside of the said vehicle.

2. Machine according to claim 1, characterized in that the tube (10) is connected at one end to the casing (8) and has disposed at its opposite upper end a slide bearing (12) which is disposed inside of the tube socket (11), and there is a space, preferably increasing in the direction downwards, between the tube (10) which narrows in diameter downward from the slide bearing and the inside of the tube socket (11) wherein said tube socket (11) has substantially vertical walls.

3. Machine according to claim 1, characterized in that the lever arm (17) is connected to an hydraulic apparatus (21) connected to the vehicle for rotating the arm (17) and the casing (8) surrounding the feeder screw (7) fixed mounted thereto.

4. Machine according to claim 1 characterized in that the casing (8) of the feeder screw axially and substantially along the entire length thereof has at least one bulge (25) with a stopping surface (26) provided in the longitudinal direction of the said bulge relative to the feeder screw (7).

5. Machine according to claim 4, characterized in that the casing (28) surrounding the feeder screw (31) has a plurality of bulges evenly distributed about the casing and each having a stopping surface (30) and in that the portions of the casing (28) between the said bulges is located very close to the periphery of the feeder screw.

6. Machine according to claim 1, characterized in that a hydraulic motor (22) is fixed mounted at one side of the casing (8) at the outer end thereof for driving an encased transmission (23) to rotate the shaft of the feeder screw (7).

7. Machine according to claim 1, characterized in that the casing (8) of the feeder screw carries a scratching means in front of the receiving mouth (9) comprising a shaft (32) substantially parallel to the axis of the feeder screw and having several scratcher pins (33) distributed along the said shaft (32), which pins when directed downwards reaches the level of the lower part of the casing, and in that the shaft (32) over a transmission (34) can be driven from the shaft of the feeder screw by the hydraulic motor (22).

* * * * *